United States Patent [19]

Briggs et al.

[11] 4,222,906

[45] Sep. 16, 1980

[54] PROCESSING GREEN STRENGTH POLYMERS

[75] Inventors: George J. Briggs; Yung-Kang Wei, both of Sarnia, Canada

[73] Assignee: Polysar Limited, Sarnia, Canada

[21] Appl. No.: 900,480

[22] Filed: Apr. 27, 1978

[30] Foreign Application Priority Data

Oct. 27, 1977 [CA] Canada ................................. 289716

[51] Int. Cl.$^2$ .......................... C08L 7/00; C08L 9/06; C08L 9/00
[52] U.S. Cl. .................................... 260/5; 260/42.47; 260/42.56; 525/194; 525/217; 525/233; 525/236
[58] Field of Search ....................... 260/42.56, 894, 5; 525/217, 233, 236

[56] References Cited

U.S. PATENT DOCUMENTS

| 3,872,036 | 3/1975 | Todani et al. | 260/894 |
|---|---|---|---|
| 3,969,330 | 7/1976 | Lasis et al. | 526/14 |
| 4,005,053 | 1/1977 | Briggs et al. | 260/33.6 AQ |
| 4,052,542 | 10/1977 | Wei et al. | 526/46 |
| 4,070,340 | 1/1978 | Lasis et al. | 526/20 |

Primary Examiner—Wilbert J. Briggs, Sr.
Attorney, Agent, or Firm—Stevens, Davis, Miller & Mosher

[57] ABSTRACT

An improved method is provided for processing of rubbers in which one of the rubbers is a synthetic green strength polymer, the improvement being the addition of the synthetic green strength polymer at the second stage of mixing rather than at the prior art first stage. The method can be used for preparing rubber compounds whenever a synthetic green strength polymer is used as one component of the rubber compound.

8 Claims, No Drawings

PROCESSING GREEN STRENGTH POLYMERS

This invention is directed to an improved method of processing synthetic polymers having green strength so that the green strength is retained at a desirable level and the polymer system also has good processing characteristics.

Natural rubber is well known as possessing green strength which is believed to be due to crystallization of the isoprene units on elongation. Synthetic polymers possessing green strength have been developed recently wherein polymers containing tertiary amine groups are reacted with halogen compounds to form quaternary ammonium salts. Such green strength synthetic polymers behave as normal polymers during processing under shear and at elevated temperatures and on cooling to about room temperature develop green strength. Thus, the well known deficiency of synthetic polymers, especially styrene-butadiene polymers, due to the lack of green strength has been overcome.

Such polymers may be used in a wide variety of end uses, especially such as the production of tires, mechanical goods, hoses, etc. The green strength is of importance during the handling and shaping of the compounds formed from the polymers and prior to vulcanization, compounds containing green strength polymers not being liable to rupture on elongation and being able to retain shape.

It has previously been found that a synthetic polymer having green strength may be used in admixture with other polymers and still provide green strength to the mixture. Thus, a styrene-butadiene green strength polymer may be mixed with a conventional styrene-butadiene polymer, a polybutadiene, an EPDM, a halogenated butyl, cis-polyisoprene and/or natural rubber and still provide an improved level of green strength to the mixture. This is of significance to the tire industry because many tires contain mixtures of polymers and the tire manufacturer does not have to rely solely on using natural rubber to provide green strength.

We have now discovered an improved method for processing synthetic green strength polymers.

The present invention provides an improved method for processing synthetic green strength polymers which comprises adding the synthetic green strength polymer to a second stage of mixing of polymer, carbon black, oil, other additives and curatives. Thus the present invention provides an improved method for processing synthetic green strength polymers in admixture with other polymer, said other polymer being one or more of other synthetic polymers and natural rubber, the improvement being that in a first stage of mixing said other polymer is mixed in an internal rotary mixer with carbon black and optionally one or more of oil and other compounding additives except cure active ingredients to produce an essentially uniform mixture and said mixture is removed from the mixer, and in a second stage of mixing said mixture is mixed in an internal rotary mixer or on a rubber mill with the cure active ingredients, optionally other compounding additives and with a synthetic green strength polymer to product an essentially uniform compound which on resting develops green strength.

In a preferred embodiment of the invention, zinc oxide and stearic acid are added in the second stage of mixing together with the cure active ingredients and the synthetic green strength polymer.

The synthetic green strength polymer referred to herein is a polymer containing bound tertiary amine groups which have been reacted with a dihalogen compound to form quaternary ammonium salts. Preferably, the green strength polymer is a styrene-butadiene polymer containing bound tertiary amine groups which have been reacted with a dihalogan compound. Most preferably, the green strength polymer is a polymer prepared by emulsion polymerization and containing from 60 to 85 weight percent, most preferably from 70 to 82 weight percent, of butadiene, from 40 to 15 weight percent, most preferably from 30 to 18 weight percent, of styrene and from 0.5 to 10 millimoles of bound tertiary amine groups per 100 grams of polymer by the copolymerization with the butadiene and styrene of a monomer selected from dimethylaminoethyl acrylate, diethylaminoethyl acrylate, dimethylaminoethyl methacrylate and diethylamonoethyl methacrylate. Suitable dihalogen compounds reacted with the bound tertiary amine groups are those that react to form quaternary ammonium salts. Suitable such dihalogen compounds include those compounds where the halogen groups are activated by adjacent carbon-carbon double bonds, aromatic nuclei or electron donor groups such as carbonyl. Preferably the dihalogen compounds are selected from compounds of formula

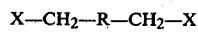

X—CH$_2$—R—CH$_2$—X where X is chlorine or bromine and where R is a mononuclear group containing one CH$_2$-X or methoxy group, or a polynuclear aromatic group selected from biphenyl, biphenyl, ether, biphenyl alkane the alkane residue having 1 to 4 carbon atoms, and naphthalene, the aromatic groups being unsubstituted or substituted, each CH$_2$-X group being associated with a separate nucleus of the poly-nuclear aromatic compound and linked directly to said nucleus, or from compounds of formula

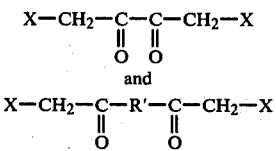

$$X-CH_2-\underset{\underset{O}{\|}}{C}-\underset{\underset{O}{\|}}{C}-CH_2-X$$

and $$X-CH_2-\underset{\underset{O}{\|}}{C}-R'-\underset{\underset{O}{\|}}{C}-CH_2-X$$

where X is chlorine or bromine, and R' is one of
(a) an alkylene group selected from CH$_2$, CH$_2$—CH$_2$, CH(CH$_3$) and C(CH$_3$)$_2$, or
(b) an aromatic group selected from the mononuclear aromatic group or a poly-nuclear aromatic group selected from biphenyl, biphenyl ether, biphenyl alkane the alkane residue having 1 to 4 carbon atoms, and naphthalene, and where each

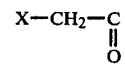

$$X-CH_2-\underset{\underset{O}{\|}}{C}$$

group is in a separate aromatic nucleus except when R is the mono-nuclear aromatic group.

The amount of such dihalogen compound reacted with the tertiary amine groups bound in the polymer is preferably from 0.1 to 10 millimoles of halogen groups per 100 grams of polymer; however, larger amounts of dihalogen compound may be used if desired.

Specific examples of suitable halogen compounds include, 1,4-dibromobutene-2, α,α'-dibromoxylene, α,α'-dichloroxylene, 4,4'-bis(chloromethyl) biphenyl, 4,4'-bis(bromomethyl) biphenyl ether, 4,4'-bis(bromomethyl) biphenyl methane, 2,6-bis(chloromethyl) naphthalene, 4,4'-bis(bromoacetyl) biphenyl, 4,4'-bis(chloromethyl) biphenyl ether, 4,4'-bis(bromomethyl) biphenyl methane, 2,6-bis(bromoacetyl) naphthalene, 1,4-bis(chloroacetyl) benzene, 1,4-dibromobutane-2,3-dione and 1,5-dibromopentane-2,4-dione.

In conventional processing methods, the compounder will use a two-stage process in which all the rubber, black, oil and many of the other compounding additives are mixed together in the first stage, the mix is dumped and cooled and then, in a second stage, the cure active ingredients are added. By this method, which involves relatively high temperatures in the first stage and somewhat lower temperatures and shorter time in the second stage, scorching of the compound is avoided by having the cure active ingredients present only in the second stage. This method allows the use in the first stage of relatively high temperatures and ensures good dispersion of the fillers, especially the carbon black, throughout the mixture.

If this conventional processing method is used when a synthetic green strength polymer is a part of the rubber added to the first stage, certain problems are found to occur. First, it is necessary to have a high level of green strength in the synthetic green strength polymer in order to get an acceptable level of green strength in the final compound—it appears that some of the green strength is lost during the first stage processing. Second, the high level of green strength necessary reduces the "processability" or mixing characteristics of the components in the first stage; the processability at this stage is of great importance in obtaining a uniform mixture which will handle in a consistent manner. Finally, and as applicable to a preferred embodiment of this invention, the presence of zinc oxide and stearic acid in the first stage mixing appears to detract from the processability of the mixture when the green strength polymer is also present.

To overcome these problems, the green strength polymer is added at the second stage of mixing and preferably the zinc oxide and stearic acid are also added, together with the green strength polymer, at the second stage of mixing.

Suitable rubbers which may be used in the first stage mixing of the process of this invention are compatible synthetic polymers which are one or more of conventional styrene-butadiene polymers which may include oil-extended polymers, polybutadiene which may include oil-extended polymer, ethylene-propylene-diene monomer polymers, brominated or chlorinated butyl polymers, cis-1,4-polyisoprene, and natural rubber. Mixtures of such polymers such as natural rubber and polybutadiene, natural rubber and styrene-butadiene polymer, and natural rubber, polybutadiene and styrene-butadiene polymer may be used. Carbon black is mixed with the rubber at the first stage—the selection of the carbon black is well known in the industry. Oil may optionally be added at the first stage of mixing; the oil may be a naphthenic or an aromatic type well known in the industry. Other compounding ingredients may be added at the first stage of mixing—such other compounding ingredients may include antioxidants, antiozonants, various types of resins such as phenolic resins and bonding resins, waves and, except in the preferred embodiment, zinc oxide and stearic acid. Suitable internal rotary mixers include the Banbury (trademark) mixers well known in the industry, operated at conventional temperatures and for conventional times, the mixture usually being discharged after 3–7 minutes mixing time and at a temperature of 160°–185° C. The mixture is usually allowed to rest and cool for some time and is then put into the second stage of mixing. In the second stage, the mixture is added first, followed within one-half to one minute by the addition of the cure active ingredients and the synthetic green strength polymer and, in the preferred embodiment, the zinc oxide and stearic acid and any other compounding additives, for example, the second part of a bonding resin if a first part has been added in the first stage mixing. The second stage mixing can be either in an internal mixer or on a rubber mill; a Banbury would be operated at about 80° C. and the mixing would be for about 2 to 5 minutes and a mill would be operated with the rolls at about 120° C. for about 3 to 5 minutes. Suitable cure active ingredients added to this second stage include elemental sulphur and at least one accelerator selected from the guanidines, thiazoles, thiurams, dithiurams and dithiocarbamates.

Using the method of the present invention, the total amount of polymers is 100 parts by weight, of which from 15 to 35, preferably from 20 to 30, parts by weight would be synthetic green strength polymer added at the second stage of mixing. Thus, the amount of polymer added at the first stage of mixing is from 65 to 85 parts by weight, preferably from 70 to 80 parts by weight. The polymer added at the first stage may be a mixture, such as from 40 to 60 parts by weight of natural rubber and from 20 to 30 parts by weight of polybutadiene. Suitably, the amount of carbon black added to the first stage of mixing is from 30 to 60 parts by weight, preferably from 35 to 50 parts by weight. The synthetic green strength polymer may be a styrene-butadiene polymer as hereinbefore defined and may contain from 0 to about 45, preferably about 35 to 38, parts by weight of oil per 100 parts by weight of polymer.

The following examples are intended to illustrate the present invention and do not limit the scope thereof:

EXAMPLE 1

An oil-extended styrene-butadiene rubber, commercially available as KRYNOL 1712 (KRYNOL is a Trade Mark) was mixed with a synthetic green strength styrene-butadiene polymer which contained about 23 weight percent of styrene, about 76 weight percent of butadiene and 0.6 weight percent of dimethylaminoethyl methacrylate and had about 35 parts by weight of a naphthenic extender oil per 100 parts by weight of polymer. The polymer had been reacted with, for Polymer A 0.08 parts by weight per 100 parts by weight of polymer, and for Polymer B 0.12 parts by weight per 100 parts by weight of polymer, of 4,4'-bis(bromoethyl) biphenyl ether. The carbon black used was a N-550 type. All mixing was done in a Brabender mixer (Brabender is a Trade Mark) operated at 100 rpm.

With reference to Table I, in Experiment No. 10, 70 parts by weight of KRYNOL 1712, 50 parts by weight of carbon black, 3 parts by weight of zinc oxide and 1 part by weight of stearic acid were mixed in a first stage of mixing be setting the temperature of the mixer at 100° C., adding the rubber, followed 1 minute later by ⅓ of the carbon black, zinc oxide and stearic acid, followed 1 minute later by a further ⅓ of the carbon black, zinc oxide and stearic acid and 1 minute later by the final ⅓ of the carbon black, zinc oxide and stearic acid. The mixer was stopped after a total mixing time of 7 minutes, following which the mixture was removed. In the second stage of mixing, the first stage mixture was added to the mixer followed 1 minute later by 30 parts by weight of the green strength polymer (Polymer B), 1.25 parts by weight of N-cyclohexyl-2-benzothiazole sulphenamide and 2 parts by weight of elemental sulphur and the mixer was stopped at a total mixing time of 5 minutes. The compound was removed and essentially immediately pressed into a sheet by heating at 100° C. for 10 minutes. Dumbbells for green strength measurement were cut from these sheets. For Experiment No. 11, the same procedure was followed except that the mixer was at a starting temperature of 130° C. and the green strength polymer was Polymer A and for Experiment No. 12, the procedure was the same using Polymer B and a mixer starting temperature of 130° C. For Experiment No. 13, 80 parts by weight of KRYNOL 1712 and 50 parts by weight of carbon black were added to the mixer which was operated starting at 130° C. by adding the polymer at zero time and the carbon black in ⅓ portions at 1 minute intervals and the whole mixed for a total time of 7 minutes. In the second stage of mixing this temperature was added to the mixer at zero time, at 1 minute 20 parts by weight of the green strength polymer (Polymer B) and the whole mixed for a total time of 5 minutes. For Experiment Nos. 14 and 15, which are controls, 70 parts by weight of KRYNOL 1712 and 30 parts by weight of green strength polymer (Polymer B) were added at zero time of the first stage of mixing, the mixer being at 100° C. and 130° C. respectively at the start of each experiment. Zinc oxide (3 parts by weight), stearic acid (1 part by weight) and carbon black (50 parts by weight) were added in portions of ⅓ at 1 minute intervals starting at 1 minute. Total mixing time was 7 minutes. For the second stage of mixing, this mixture was added at zero time and the N-cyclohexyl-2-benzothiazole sulphenamide and sulphur were added at 1 minute, the total mixing time being 5 minutes.

TABLE I

| Experiment No. | 10 | 11 | 12 | 13 | Controls 14 | 15 |
|---|---|---|---|---|---|---|
| Polymer | B | A | B | B | B | B |
| Processing temp. °C. | 100 | 130 | 130 | 130 | 100 | 130 |
| Green strength properties Modulus (kg/cm²) at elongation of | | | | | | |
| 100% | 5.9 | 6.0 | 6.0 | 5.0 | 4.8 | 5.2 |
| 200% | 8.9 | 8.3 | 7.6 | 6.3 | 4.6 | 5.6 |
| 300% | 9.9 | 9.5 | 8.0 | 6.9 | 4.2 | 5.2 |
| 400% | 9.4 | 8.9 | 7.5 | 6.6 | 3.3 | 4.7 |
| 500% | 8.1 | — | 6.5 | 5.6 | — | 4.1 |
| Elongation at break % | 600 | 430 | 520 | 560 | 430 | 700 |

From the data in Table I it is clear that the controls show inadequate green strength because the maximum modulus occurs at a low elongation, i.e. for Experiment No. 14 below 100% elongation and for Experiment No. 15 below 200% elongation. This shows that the two-stage mixing in which the green strength polymer is added only at the second stage yields compounds having improved green strength.

Sheets of the above compounds were vulcanized (except for Experiment No. 13) by heating for 40 minutes at 145° C. and the stress-strain properties of the vulcanizates were determined. The vulcanizates of Exmperiment Nos. 10, 11 and 12 showed slightly higher 100% and 300% moduli and tensile strength than the vulcanizates of Experiment Nos. 14 and 15.

EXAMPLE 2

In these experiments, Polymer M was a commercially available oil-extended styrene-butadiene polymer, KRYNOL 1778 (KRYNOL is a Trade Mark) and Polymer L was an oil-extended (about 37 parts of oil per 100 parts of polymer) styrene (23 weight percent)-butadiene (about 76 weight percent)-dimethylaminoethyl methacrylate (0.6 weight percent) polymer. The mixing for first stage was in a Model B Banbury (Banbury is a Trade Mark) with the rotors operated at 77 rpm and the temperature starting at 100° C., the mixture having a temperature of 170°–177° C. on dumping after 5 minutes' mixing. The polymer was added at zero time and the other ingredients were added at 1 minute. The actual recipes used are shown in Table II. On dumping, a portion of the product was sheeted out and used for green strength and Mooney measurements. For Experiment No. 22 a portion of the product was put into a Brabender and 0.5 minutes later the zinc oxide and stearic acid were added. The Brabender was operated at 100 rpm and a temperature of 130° C. and the compound was mixed for a total time of 6 minutes. On dumping, the compound was sheeted out and used for green strength and Mooney determinations.

TABLE II

| Experiment No. | 21 Control | 22 | 23 Controls | 24 |
|---|---|---|---|---|
| 1. First Stage Mixing | | | | |
| Polymer type | L | L | M | M |
| Polymer | 100 | 100 | 100 | 100 |
| Carbon black | 37 | 37 | 37 | 37 |
| Zinc oxide | 1.7 | — | 1.7 | — |
| Stearic acid | 0.6 | — | 0.6 | — |
| Product Mooney (ML 1 + 4 at 100° C.) | | | | |
| at 4 hours | 107 | 69 | 48 | 46 |
| at 5 days | 106 | 80 | 49 | 46 |
| Product Green Strength Strength at elongation, (kg/cm²) | | | | |
| 100% | 7.3 | 4.0 | 3.5 | 2.6 |
| 200% | 8.8 | 4.5 | 3.2 | 2.0 |
| 300% | — | 5.3 | 2.9 | 1.7 |
| 400% | — | 6.0 | 2.7 | — |
| 500% | — | 6.4 | 2.3 | — |
| Elongation at break % | 265 | 650 | 600 | 310 |
| 2. Second Stage Mixing | | | | |
| Mixture from 1st stage | | 58 | | |
| Zinc oxide | | 1 | | |
| Stearic acid | | 0.3 | | |
| Product Mooney (ML 1 + 4 at 100° C.) | | | | |
| at 4 days | | 64 | | |
| Product Green Strength Strength at elongation, (kg/cm²) | | | | |
| 100% | | 4.1 | | |
| 200% | | 4.6 | | |
| 300% | | 5.1 | | |
| 400% | | 5.4 | | |
| 500% | | 5.1 | | |
| Elongation at break % | | 540 | | |

Note: all quantities parts by weight.

The results in Table II show that in control Experiment No. 21, the product from the first stage mixing has an extremely high Mooney and a very high green strength but low elongation. Its processing characteristics were very poor. In contrast, the results for Experiment No. 22 show the product to have an acceptable Mooney, green strength and elongation to break and that addition of the zinc oxide and stearic acid to the second stage of mixing does not significantly affect these characteristics. This polymer had good processing characteristics. Using a conventional styrenebutadiene polymer, Experiment Nos. 23 and 24, shows that the addition of the zinc oxide and stearic acid at the first stage of mixing yields a product of low green strength (the maximum strength occurs below 100% elongation) but having good processing characteristics.

EXAMPLE 3

A tire carcass type recipe was mixed and tested. The polymers used were natural rubber, SMR CV grade, an oil-extended styrene-butadiene polymer KRYNOL 1778 or Polymer L of Example 2, and polybutadiene TAKTENE 1203 (TAKTENE is a Trade Mark). The carbon black was a N-550 grade. The basic recipe was (all parts being parts by weight of rubber hydrocarbon

| First Stage | Natural Rubber | 50 |
|---|---|---|
| | *SBR | 30 |
| | Polybutadiene | 20 |
| | Carbon black | 40 |
| | Phenolic Resin | 5 |
| | *Zinc oxide | 5 |
| | *Stearic acid | 1.5 |
| | Bonding Resin R-6 | 2 |
| Second Stage | Above mesterbatch | total |
| | Bonding Resin M-3 | 1 |
| | N-cyclohexyl-2-benzo-thiazole sulphenamide | 0.9 |
| | Sulphur | 3 |
| | Diphenyl guanidine | 0.2 |

The asterisk indicates that one or more of these materials may be omitted from the first stage and added instead at the second stage. The first stage mixing was in a Model B Banbury, the starting temperature being 80° C. and the mixing time being 3-4 minutes. The second stage mixing was on a rubber mill operated at 122° C. and the total milling time was from 3-5 minutes. The compound from the second stage mixing was sheeted out and a portion was used for green strength determinations and a portion was vulcanized and the vulcanizate properties were determined and found to be all essentially the same. The green strength data are shown in Table III.

oxide and stearic acid are added at the second stage, exhibits a somewhat lower green strength. Experiment No. 33B, in which the green strength SBR, zinc oxide and stearic acid are all added at the second stage, has an improved green strength and Experiment No. 34B, in which the green strength SBR is added at the second stage, also shows an improved green strength, though not quite as good as for No. 33B. Only Experiment Nos. 33B and 34B are in accordance with the present invention.

What is claimed is:

1. An improved method for processing synthetic green strength polymers in admixture with other polymer, said other polymer being one or more of other synthetic polymers and natural rubber, said other synthetic polymers being one or more of styrene-butadiene polymers, polybutadiene and cis-1,4-polyisoprene, said synthetic green strength polymer being a styrene-butadiene polymer containing bound tertiary amine groups which have been reacted with a halogen compound to form quaternary ammonium salts, the amount of said synthetic green strength polymer being from 15 to 35 parts by weight and the amount of said other polymer being from 65 to 85 parts by weight for a total amount of polymers of 100 parts by weight, the improvement being that in a first stage of mixing said other polymer is mixed in an internal rotary mixer with carbon black and optionally one or more of oil and other compounding additives except cure active ingredients to produce an essentially uniform mixture and said mixture is removed from the mixer, and in a second stage of mixing said mixture is mixed in an internal rotary mixer or on a rubber mill with the cure active ingredients, optionally other compounding additives and with said synthetic green strength polymer to produce an essentially uniform compound which on resting develops green strength.

2. The method of claim 1 wherein the other polymer is natural rubber and polybutadiene or natural rubber and styrene-butadiene polymer or natural rubber, polybutadiene and styrene-butadiene polymer.

3. The method of claim 1 wherein the amount of carbon black is from 30 to 60 parts by weight per 100 parts by weight of total amount of polymers.

4. The method of claim 1 wherein the cure active

TABLE III

| Experiment No. | 31A | 31B | 32A | 32B | 33A | 33B | 34A | 34 |
|---|---|---|---|---|---|---|---|---|
| SBR type | 1778 | Polymer L | 1778 | Polymer L | 1778 | Polymer L | 1778 | Polymer L |
| SBR added at stage | 1st | 1st | 1st | 1st | 2nd | 2nd | 2nd | 2nd |
| ZnO added at stage | 1st | 1st | 2nd | 2nd | 2nd | 2nd | 1st | 1st |
| Stearic acid added at | 1st | 1st | 2nd | 2nd | 2nd | 2nd | 1st | 1st |
| Green strength properties | | | | | | | | |
| Strength at elongation %, (kg/cm²) | | | | | | | | |
| 100% | 2.8 | 3.4 | 2.7 | 3.2 | 2.8 | 3.5 | 2.8 | 3.2 |
| 200% | 2.7 | 3.5 | 2.5 | 3.2 | 2.7 | 4.3 | 2.6 | 3.7 |
| 300% | 2.5 | 3.8 | 2.0 | 3.3 | 2.7 | 5.0 | 2.6 | 4.4 |
| 400% | 2.3 | 4.2 | 1.8 | 3.3 | 2.7 | 5.4 | 2.6 | 4.7 |
| Elongation at maximum strength % | 100 | 700 | 90 | 500 | 100 | 600 | 100 | 500 |
| Elongation at break % | 900 | 920 | 1000 | 1000 | 930 | 920 | 1000 | 930 |

All of the Experiment Nos. A contain regular SBR and show little effect of the changes in mixing procedure whereas all the Experiment Nos. B contain green strength SBR and exhibit a dependence of the green strength on the mixing procedure. Experiment No. 31B, using the convention procedure, has a reasonable green strength; Experiment No. 32B, in which the green strength SBR is added at the first stage and the zinc ingredients include elemental sulphur and at least one accelerator selected from the guanidines, thiazoles, thiurams, dithiurams and dithiocarbamates.

5. The method of claim 1 wherein the other compounding additives added in the first stage include zinc oxide and stearic acid and optionally one or more of antioxidants, antiozonants, phenolic resins, bonding resins and waxes.

6. The method of claim 1 wherein the other compounding additives added in the first stage are selected from one or more of antioxidants, antiozonants, phenolic resins, bonding resins and waxes and the compounding additives added in the second stage include zinc oxide and stearic acid.

7. The method of claim 1 wherein the essentially uniform mixture from the first stage is discharged at a temperature of about 160° to 185° C. and the essentially uniform compound of the second stage is mixed at a temperature of about 80° to about 130° C.

8. The method of claim 1 wherein the polymers mixed in the first stage are from 40 to 60 parts by weight of natural rubber and from 20 to 30 parts by weight of polybutadiene and the amount of carbon black is from 35 to 50 parts by weight, and the amount of green strength polymer added in the second stage is from 20 to 30 parts by weight, said green strength polymer containing about 35 to 38 parts by weight of oil per 100 parts by weight of polymer.

* * * * *